UNITED STATES PATENT OFFICE.

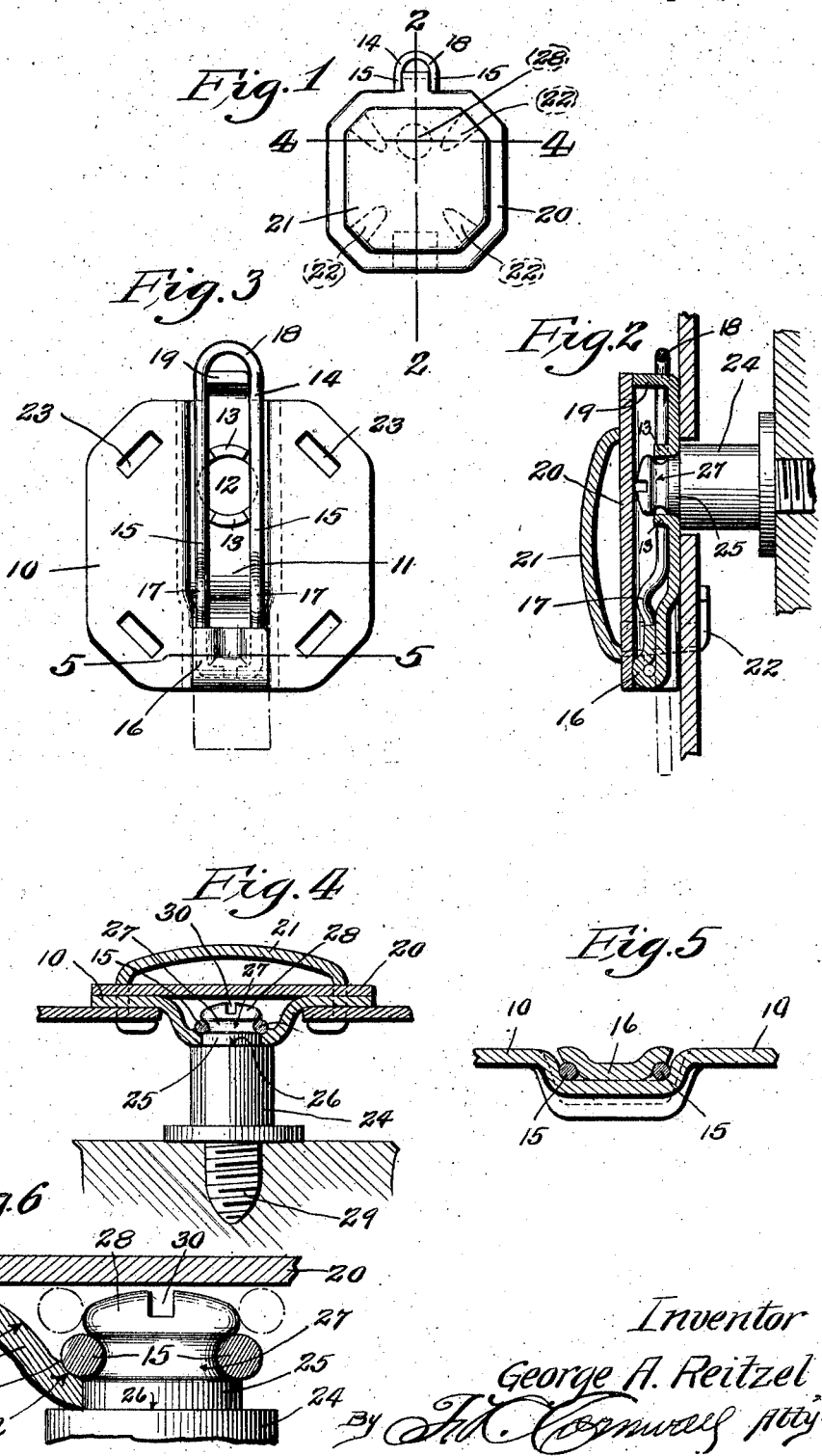

GEORGE A. REITZEL, OF ST. LOUIS, MISSOURI.

SNAP-FASTENER.

1,315,415. Specification of Letters Patent. Patented Sept. 9, 1919.

Application filed November 4, 1918. Serial No. 261,007.

*To all whom it may concern:*

Be it known that I, GEORGE A. REITZEL, a citizen of the United States, residing at St. Louis, Missouri, have invented a certain new and useful Improvement in Snap-Fasteners, of which the following is a full, clear, and exact description, such as will enable others skilled in the art to which it appertains to make and use the same, reference being had to the accompanying drawings, forming part of this specification.

My invention relates to a snap fastener or clasp, of the general type disclosed in Patent No. 1,199,422, issued to me September 26, 1916, the principal object of my present invention being to generally improve upon and simplify the construction of the fastener disclosed in my patent aforesaid; and to provide a device which can be easily and cheaply manufactured and which is very effective in performing its intended functions.

Further objects of my invention are, to provide a relatively strong and substantial fastening device, the separable parts of which can be readily connected or disconnected, and further, to provide a combined guide and seat for the stud portion of the device, thereby greatly facilitating the movement of the stud into and out of the spring catch carrying member, and likewise affording means for retaining the two parts of the device in firm engagement with each other when properly connected.

Fasteners of my improved construction are applicable for a wide variety of uses, for instance, upon vehicle curtains, and upon various articles of wearing apparel, such as gloves, footwear, leggings, raincoats, and the like.

With the foregoing and other objects in view, my invention consists in certain novel features of construction and arrangement of parts, hereinafter more fully described and claimed, and illustrated in the accompanying drawings, in which—

Figure 1 is a plan view of the clasping member of my improved fastener.

Fig. 2 is an enlarged vertical section taken approximately on the line 2—2 of Fig. 1 and showing the clasping member in proper position upon the head or stud portion of the fastener.

Fig. 3 is a plan view of the base plate of the clasp member and showing the spring in position upon said base plate.

Fig. 4 is an enlarged cross section taken approximately on the line 4—4 of Fig. 1.

Fig. 5 is an enlarged cross section taken approximately on the line 5—5 of Fig. 3.

Fig. 6 is an enlarged detail section showing portions of the head or stud and the clasping member in their positions of engagement.

Referring by numerals to the accompanying drawings which illustrate a practical embodiment of my invention, 10 designates a base plate, preferably formed of sheet metal, the central portion of which is depressed to form a longitudinally disposed channel 11, a portion of one end of which is narrower and slightly less in depth than the main portion of said channel. Formed through this base plate in the bottom of the wider portion of the channel 11 is a circular aperture 12 which is adapted to receive the head or stud portion of the device.

Formed integral with the plate and projecting upwardly therefrom on opposite sides of this aperture are arcuate lips or flanges 13, the same serving as combined guides and seats for that portion of the head or stud which projects through aperture 12. The side edges of these arcuate lips or flanges serve as bearings for the legs of the spring carried by the base plate 10. This spring, designated by the numeral 14, is preferably formed of a single piece of resilient wire bent near its center to form a pair of substantially parallel legs 15. The end portions of these legs occupy the relatively narrow and shallow end portion of the channel 11 and are secured to plate 10 in any desired manner, preferably by being clamped to said base by a portion of metal 16, the latter being formed integral with the plate 10 at the narrow end of the channel and bent over onto the ends of said legs. (See Fig. 5).

Immediately adjacent the inner edge of the clamping portion 16 the legs 15 of the spring are bent upwardly and thence downwardly as designated by 17 in order to enhance the resiliency of the legs and when properly positioned upon the base plate 10, the legs 15 occupy the side portions of the bottom of channel 11 with the intermediate portions of said legs bearing against the edges of the arcuate lips 13. (See Fig. 3.)

The lower portions of the side walls of the longitudinally disposed channel 11 are formed with longitudinally disposed spring seats *a* which are curved in cross section, the upper ends of said seats terminating in shoulders *b* and from said shoulders the upper surfaces of the side walls curve gradually upward and outward, as designated by *c*. (See Fig. 6.) Under normal conditions, and while in stud-engaging position, the legs 15 of the spring rest directly upon the seats *a*, as illustrated in Fig. 6.

The curved central portion 18 of the section of wire forming the spring projects a slight distance beyond the edge of base plate 10 and incloses a lip or flange 19 which latter is formed integral with and bent upwardly from the edge of plate 10 at the end of channel 11, said lip serving to partially close the end of the channel opposite the end which is closed by the clamping member 16.

A liner plate 20 is positioned on top of base plate 10 and serves as a cover for the channel 11 and the spring positioned therein, and applied to the top of this liner plate is a convex cap plate 21, the latter being provided with integrally formed prongs 22 which pass through suitably located apertures 23 formed in the base and liner plates and said prongs also serving to secure the clasping member to a section of leather, fabric or the like.

The stud member to which the clasping member heretofore described is detachably fastened, comprises a cylindrical shank 24, the same being provided with suitable means for attachment to a solid object or a section of fabric, leather or the like, and formed integral with the top of said cylindrical shank 24 is a head or stud 25. The diameter of this head or stud is slightly less than that of the shank 24; consequently an abrupt shoulder 26 is formed between said head and shank and which shoulder is adapted to bear directly against the underside of base plate 10 when the head or stud 25 is inserted through aperture 12. The diameter of the head or stud 25 is such that it fits snugly in aperture 12 and between the arcuate bearing lips 13.

The construction just described is effective in retaining the parts of the device firmly in position when said parts are in assembled relation or secured to each other, with the result that the liability of the parts becoming accidentally detached is minimized.

Formed in the stud or head 25 is an annular groove 27 of such size as to readily receive the legs 15 of the spring and that portion of the stud or head immediately above this groove is provided with a convex top surface 28.

When the stud member of the device is manufactured for application to a solid support, the end opposite the head or stud 28 terminates in a short threaded shank 29, and when this construction is provided, the convex top 28 of the stud or head is provided with a slot 30 adapted to receive a screw driver or like tool. Obviously, the lower portion of cylindrical body 24 can be provided with prongs or the like whereby the stud member may be secured to a section of fabric, leather or the like.

In connecting the two parts of the device, the same are manipulated so as to cause the stud or head 25 to enter the aperture 12 and in so entering, it will be guided into and through said opening by engagement with the arcuate lips 13.

It will be understood that legs 15 of the spring overlie opposite sides of the opening 12 as illustrated in Fig. 3, and the head or stud upon entering this opening will cause said legs to move upwardly and simultaneously spread apart a sufficient distance to permit said legs to spring over the edge of the stud or head above groove 29 and then resume their normal positions and occupy said groove, as seen in Figs. 4 and 6.

When the stud or head has been properly entered in aperture 12, the shoulder 26 between cylindrical body 24 and said head or stud will bear directly against the underside of base plate 10 around the opening 12 and the legs 15 positioned in the groove 27 also rest in the longitudinally disposed grooves *a* in the lower corners of channel 11 and at the same time bear against shoulders *b* at the upper edges of said grooves *a*. This particular arrangement of the legs 15 is very effective in retaining the head or stud in engaged position and it is practically impossible to separate the parts of the device until the spring is properly manipulated to release the head or stud. This release is accomplished by engaging the underside of the projecting end portion 18 of the spring and pulling the same upward, such action drawing the legs 15 upwardly and outwardly with respect to the groove 27 and grooves *a* and when the legs have passed the flange or rib on the head immediately above the groove 27, their normal tendency is to spring inwardly toward each other and at the same time move downward to their normal positions, and this action is effective in forcing the head or stud out of the aperture 12.

Thus it will be seen that I have provided a relatively simple and efficient fastener or clasp, the parts of which can be readily engaged or disengaged by proper manipulation and that said device can be advantageously utilized upon various articles, wearing apparel, and upon vehicle curtains and the like.

It will be readily understood that minor changes in the size, form and construction of the various parts of my improved fastener may be made and substituted for those herein shown and described, without departing from the spirit of my invention, the scope of which is set forth in the appended claims.

I claim:

1. A fastener comprising a clasp member and a stud, said clasp member comprising a base plate in which is formed a stud receiving aperture, there being spring receiving grooves formed in said base plate to the sides of said apertures, a spring secured to said base plate, which spring is provided with substantially parallel legs which normally occupy the grooves in the base plate, and the stud member including a terminal head portion insertible through the aperture in the base plate and provided with an annular groove adapted to receive parts of the legs of the spring.

2. A fastener comprising a clasp member and a stud, said clasp member including a base plate provided with an aperture, stud guiding members on said base plate adjacent to said aperture, and a spring having portions overlying opposite sides of the aperture between the stud guiding members, and the stud member comprising a body portion, a terminal head portion separated from said body portion by a shoulder, which latter is adapted to bear against the underside of the base plate when the head portion is inserted through the aperture therein, and said head portion being provided with the annular groove adapted to receive parts of the spring.

3. A fastener comprising a clasp member and a stud member, the clasp member comprising a base plate having a channel formed therein and there being longitudinally disposed grooves formed at the lower corners of said channel, there being an aperture formed through the base plate in the bottom of the channel, a spring having substantially parallel portions occupying the grooves in the lower corners of the channel, parts of which spring overlie opposite sides of the opening in the base plate, and the stud member including a terminal head portion insertible through the aperture in the base plate and provided with an annular groove adapted to receive parts of the spring.

4. In a fastener of the class described, a clasp member comprising a base plate in which is formed a channel, there being an aperture formed through said base plate in the bottom of said channel, a spring having substantially parallel legs occupying said channel, one end of which spring is fixed to said base plate, and stud guiding means formed on said base plate on opposite sides of the opening therein.

5. In a fastener of the class described, a clasp member comprising a base plate in which is formed a channel, there being longitudinally disposed grooves formed in the lower corners of said channel, there being an aperture formed through the plate in the bottom of said channel, and a spring secured to said plate and having substantially parallel legs which normally occupy the grooves in the corners of the channel.

6. In a fastener of the class described, a clasp member comprising a base plate in which is formed a channel, there being longitudinally disposed grooves formed in the lower corners of said channel, there being an aperture formed through the plate in the bottom of said channel, a spring secured to said plate and having substantially parallel legs which normally occupy the grooves in the corners of the channel, and stud guiding means formed integral with the plate on opposite sides of the opening therein.

7. In a fastener of the class described, a clasp member comprising a base plate in which is formed an aperture, there being shoulders formed on said base plate to the sides of said aperture, a spring secured to said base plate and having substantially parallel legs which normally engage against the shoulders to the sides of the aperture, and stud guiding means on said base plate adjacent to the opening therein and between the shoulders.

8. In a fastener of the class described, a clasp member comprising a base plate provided with a channel, there being spring receiving grooves formed in the lower corners of said channel, shoulders formed on said base plate immediately above said grooves, a spring secured at one end to said base plate, which spring is provided with substantially parallel legs which occupy the grooves in the channel, and there being an aperture formed through the base plate in the bottom of the channel.

9. In a fastener of the class described, a clasp member comprising a base plate provided with a channel, there being spring receiving grooves formed in the lower corners of said channel, shoulders formed on said base plate immediately above said grooves, a spring secured at one end to said base plate, which spring is provided with substantially parallel legs which occupy the grooves in the channel, there being an aperture formed through the base plate in the bottom of the channel, and stud guiding means projecting upwardly from said base plate on opposite sides of the aperture therein.

In testimony whereof I hereunto affix my signature this 30th day of October, 1918.

GEORGE A. REITZEL.

Copies of this patent may be obtained for five cents each, by addressing the "Commissioner of Patents, Washington, D. C."